(12) United States Patent
Lequien et al.

(10) Patent No.: US 10,106,449 B2
(45) Date of Patent: Oct. 23, 2018

(54) METHOD AND DEVICE FOR MANUFACTURING A HOLLOW GLASS ITEM

(71) Applicant: Pochet du Courval, Paris (FR)

(72) Inventors: Jany Lequien, Hodeng au Bosc (FR); Pascal Froissart, Neuville Coppegueule (FR); Sebastien Baliteau, Bouttencourt (FR)

(73) Assignee: POCHET DU COURVAL, Clichy (FR)

( * ) Notice: Subject to any disclaimer, the term of this patent is extended or adjusted under 35 U.S.C. 154(b) by 0 days.

(21) Appl. No.: 15/092,567

(22) Filed: Apr. 6, 2016

(65) Prior Publication Data

US 2016/0214882 A1 Jul. 28, 2016

Related U.S. Application Data

(63) Continuation of application No. 13/707,919, filed on Dec. 7, 2012, now Pat. No. 9,334,185.

(30) Foreign Application Priority Data

Dec. 9, 2011 (FR) .................................. 11 61398

(51) Int. Cl.
*C03B 11/10* (2006.01)
*C03B 11/12* (2006.01)

(52) U.S. Cl.
CPC ............ *C03B 11/10* (2013.01); *C03B 11/127* (2013.01); *C03B 2215/50* (2013.01); *C03B 2215/72* (2013.01)

(58) Field of Classification Search
CPC ................................. C03B 11/06; C03B 11/10
See application file for complete search history.

(56) References Cited

U.S. PATENT DOCUMENTS

| 1,274,673 A | 8/1918 | Brancart |
| 2,394,116 A | 2/1946 | Snyder et al. |

(Continued)

FOREIGN PATENT DOCUMENTS

| BE | 805260 | 3/1974 |
| DE | 102006058770 B3 | 4/2008 |

(Continued)

*Primary Examiner* — Lisa L Herring
(74) *Attorney, Agent, or Firm* — Jennifer L. O'Connell; Davidson, Davidson & Kappel

(57) ABSTRACT

A method for manufacturing a hollow glass is provided. The method includes the steps of placing at least one drop of glass in a cavity of a mold, inserting a punch into the cavity of the mold, forming the hollow glass item by using the punch and simultaneously imprinting at least one raised or hollow pattern at a chosen location on an inner surface of at least one wall of the hollow glass item, thereby superimposing the at least one raised or hollow pattern on the shape of the hollow glass item, removing the punch from the cavity of the mold and stripping the hollow glass item, which includes the at least one inner raised and/or hollow pattern. The punch has a body with an end portion, the end portion has an outer side surface. The body includes a raised or hollow pattern on the outer side surface of the end portion. The raised or hollow pattern is independent of the shape of the hollow glass item. A device for manufacturing a hollow glass item is also provided.

19 Claims, 3 Drawing Sheets

(56) References Cited

U.S. PATENT DOCUMENTS

| | | | |
|---|---|---|---|
| 2,490,450 A | 12/1949 | Lysle et al. | |
| 3,468,648 A | 9/1969 | Nowak | |
| 3,785,794 A | 1/1974 | Hodges | |
| 3,819,352 A * | 6/1974 | Pei | C03B 11/06 65/357 |
| 4,072,491 A | 2/1978 | Kramer et al. | |
| 4,333,756 A | 6/1982 | Seeman | |
| 5,213,603 A | 5/1993 | Giles et al. | |
| 5,888,266 A | 3/1999 | Eagle et al. | |
| 8,333,287 B2 | 12/2012 | Lonsway et al. | |
| 2003/0026924 A1 | 2/2003 | Fait et al. | |
| 2003/0167799 A1 | 9/2003 | Tijerina-Ramos et al. | |
| 2009/0084799 A1 | 4/2009 | Mondon | |
| 2010/0147029 A1 | 6/2010 | Ishigame et al. | |
| 2012/0304698 A1 | 12/2012 | Froissart et al. | |
| 2012/0305432 A1 | 12/2012 | Froissart et al. | |

FOREIGN PATENT DOCUMENTS

| | | |
|---|---|---|
| EP | 1656859 A3 | 5/2006 |
| FR | 483945 | 8/1917 |
| FR | 2975987 A1 | 12/2012 |
| FR | 2975988 A1 | 12/2012 |
| GB | 1441771 | 7/1976 |
| JP | 60145918 | 8/1985 |
| JP | 08175824 | 7/1996 |
| JP | 2003095671 A1 | 4/2003 |
| WO | 2009042171 A1 | 4/2009 |
| WO | 2012056154 A2 | 5/2012 |

* cited by examiner

METHOD AND DEVICE FOR MANUFACTURING A HOLLOW GLASS ITEM

CROSS REFERENCE TO RELATED APPLICATIONS

This is a continuation of U.S. application Ser. No. 13/707,919 filed on Dec. 7, 2012 which claims priority to FR 11 61398 filed on Dec. 9, 2011, the entire disclosures of which are hereby incorporated by reference herein.

The present invention relates to a method and a device for manufacturing a hollow glass item, in particular comprising a bottom and side walls, for example such as a bottle or jar. The present invention also relates to a shaping punch for directly shaping such a hollow glass item.

BACKGROUND OF THE INVENTION

Hollow glass items may be manufactured using several methods.

One of these methods consists of depositing at least one drop of glass, also called a paraison, in a cavity of the mold. This cavity has an inner shape that corresponds substantially to the outer shape of the item.

Then, a punch is inserted into the cavity of the mold so as to give the item substantially its final shape.

As an example, the item may have a rectangular or square outer shape and a conical inner shape by using the punch.

SUMMARY OF THE INVENTION

However, some users of this type of glass item, in particular in the field of perfumery or cosmetics, wish to customize these items by producing raised and/or hollow decorations inside them, recalling or suggesting the trademark and/or the product contained in the items. The decoration(s) inside may be independent of the shape of the item, and the patterns may assume any desired form.

An object of the present invention may provide a method and a device for manufacturing a hollow glass item making it possible to perform this type of operation inside said items.

The present invention provides a method for manufacturing a hollow glass item, for example such as a bottle or a jar, comprising the steps of placing at least one drop of glass is placed in a cavity of a mold, inserting a punch is in the cavity, forming the glass item by using the punch, and at the same time, forming at least one raised and/or hollow pattern on an inner surface of at least one wall of the item, removing the punch from the cavity of the mold, and stripping the glass item including the at least one inner raised and/or hollow pattern.

The present invention also provides a punch for directly forming a hollow glass item, for example such as a bottle or a jar, comprising a body including a generally tapered end portion, the end portion having at least one raised and/or hollow pattern on an outer side surface.

According to other advantageous features of the invention, the punch may include one or more of the following features, considered alone or according to all technically possible combinations: the raised and/or hollow pattern has a locally back-draft shape, the end portion comprises an draft angle comprised between 2° and 15°, preferably approximately 5°.

The present invention also provides a device for manufacturing a hollow glass item, for example such as a bottle or a jar, for carrying out the method as previously described, comprising a mold including a cavity with a shape substantially corresponding to the outer shape of the glass item, and a punch in accordance with the present invention, the punch being movable between a passive position outside the cavity and an active position inside the cavity.

According to another advantageous aspect of the invention, the manufacturing device may include the following feature: the raised and/or hollow pattern has a locally back-draft shape capable of imparting a complementary back-draft shape to the glass designed to form the glass item.

BRIEF DESCRIPTION OF THE DRAWINGS

The features and advantages of the invention will appear upon reading the following description, provided as an example and done in reference to the appended drawings, in which.

DETAILED DESCRIPTION OF PREFERRED EMBODIMENTS

Figure 1:
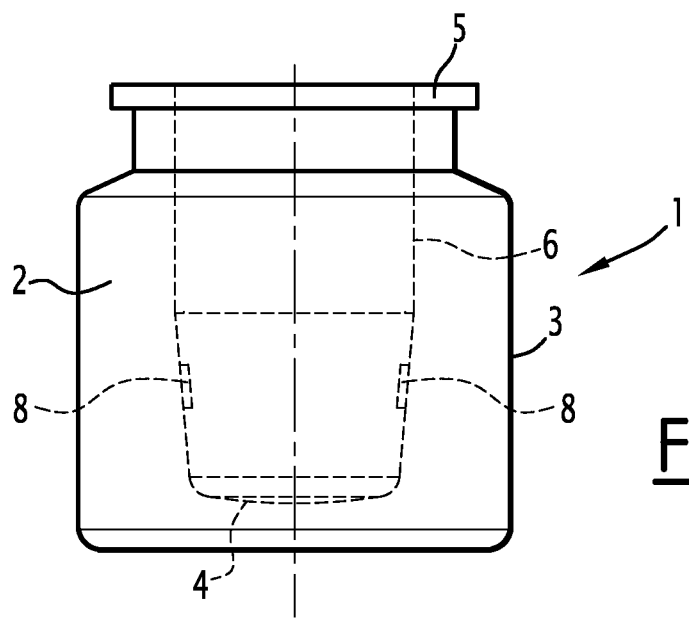
FIG. 1 is a diagrammatic elevation view of a hollow glass item, for example such as a jar, obtained using the manufacturing method according to the invention.

FIG. 1 diagrammatically shows a hollow glass item, for example such as a jar, designated by general reference 1, and which has a generally cylindrical shape in this example. This item 1 comprises a hollow body 2 defining a container delimited by a cylindrical wall 3 and a bottom 4. The body 2 comprises an upper portion opposite the bottom 4, provided with a ring 5.

In the example embodiment shown in FIG. 1, the inner hollow of the body 2 of the item 1 comprises an inner surface 6, and that hollow has a generally substantially tapered shape.

The hollow of the body 2 may assume any other form, for example such as square, rectangle or oval. In the case of a hollow having a square or rectangular shape, the glass item 1 has several side walls each comprising an inner surface.

As shown in FIG. 1, the inner surface 6 of the wall 3 of the body 2 includes at least one raised and/or hollow pattern 8 printed in the glass of the item 1.

Figure 2:
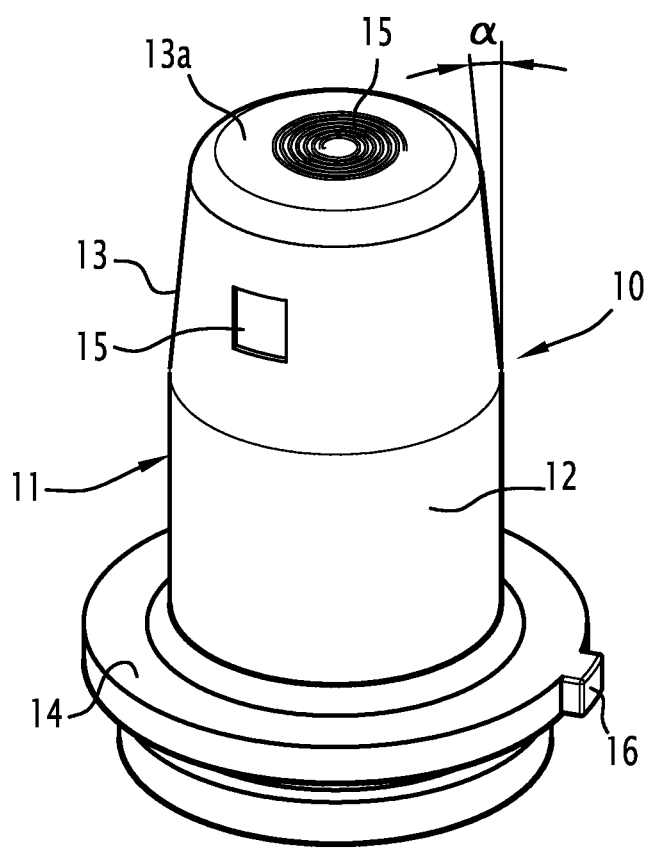
FIG. 2 is a perspective view of a direct shaping punch, according to the invention.
Figure 3:
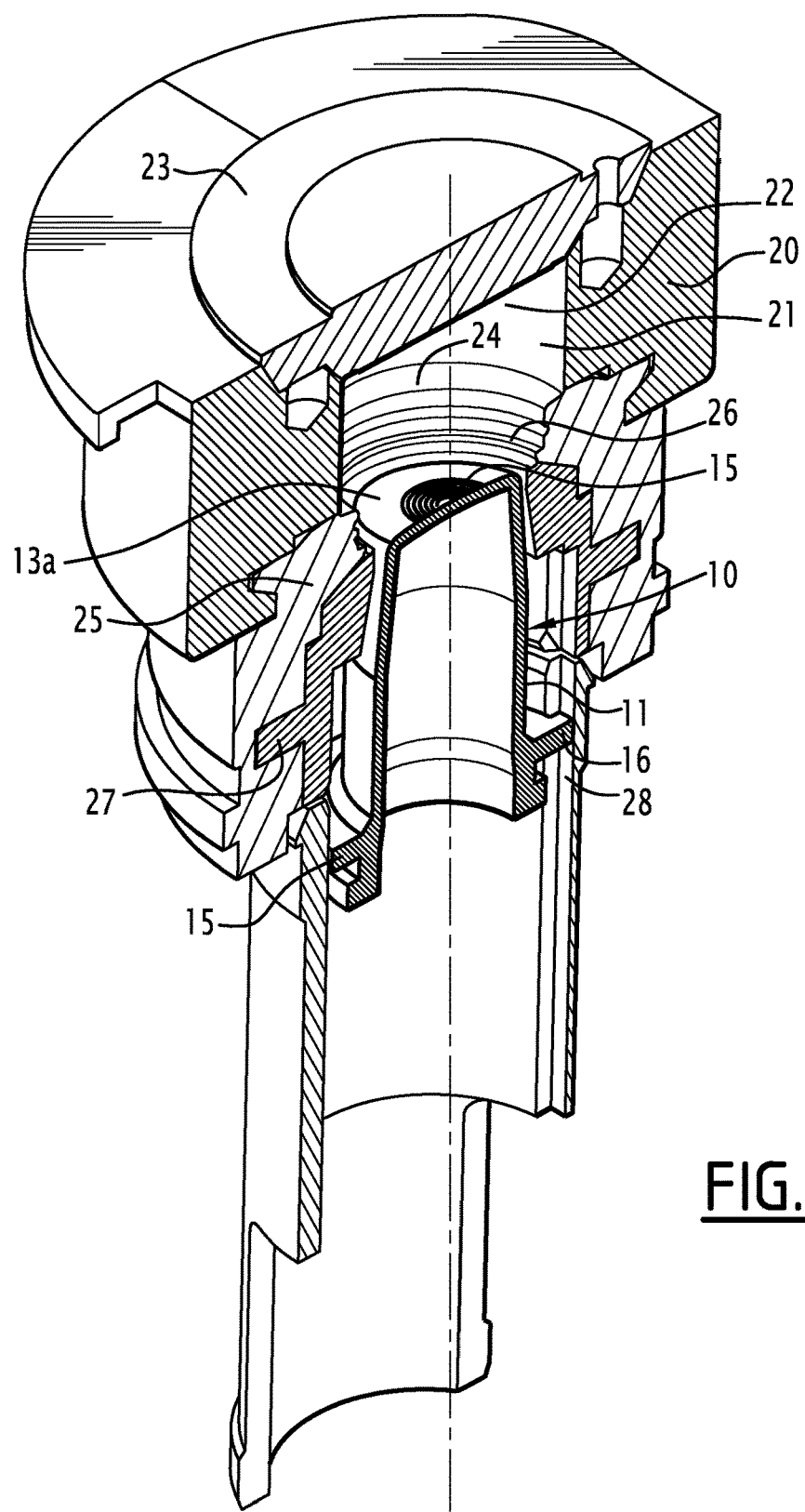
FIG. 3 is a diagrammatic and vertical cross-sectional view of a device for manufacturing a hollow glass item with the shaping punch in the passive position.
Figure 4:
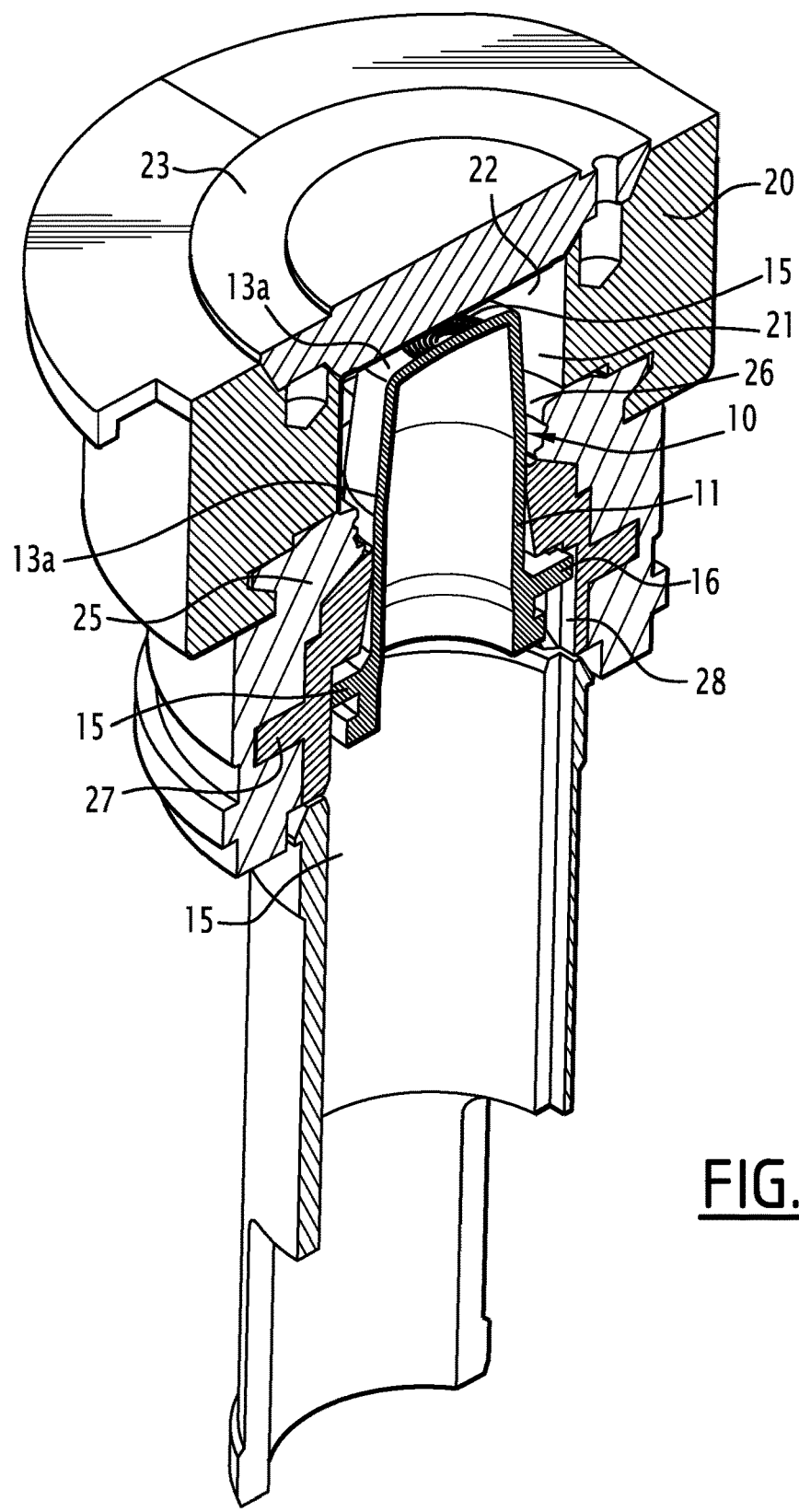
FIG. 4 is a diagrammatic perspective and vertical cross-sectional view of the manufacturing device with the shaping punch in the active position.

The glass item 1 is formed by a punch 10 shown in FIG. 2 and in a manufacturing device designated by general reference 20 and shown in FIGS. 3 and 4.

In general, the body 11 of the punch 10 includes an outer shape substantially corresponding to the shape of the hollow to be obtained in the item 1. The shape may be rectangular, square or ovoid, or any other suitable shape.

The body 11 of the punch 10 includes, in the example embodiment shown in FIG. 2, a first substantially cylindrical portion 12 and a second so-called end portion 13, extending the first portion 12.

The end portion 13 has a gradually decreasing section toward an end wall 13a. The end portion 13 has a generally tapered shape ending with the end wall 13a.

This end portion 13 has a general shape including n draft angle α comprised between 2° and 15°, preferably a draft angle α between 2° and 10°, and still more preferably a draft angle α of approximately 5° relative to the axis of the end portion 13.

The end portion 13 of the body 11 of the punch 10 includes, on the outer side surface thereof, at least one raised and/or hollow pattern 15 designed to form the at least one raised and/or hollow pattern 8 on the inner surface 6 of the wall 3 during shaping of the item 1. A raised and/or hollow pattern 15 may also be provided on the end wall 13*a* of the body 11.

"Raised and/or hollow" refers to the fact that the pattern 15 is raised and/or hollow, or has at least one raised portion and at least one hollow portion.

The raised and/or hollow pattern 15 has a locally back-draft shape, i.e. at least one surface whereof the normal is oriented opposite the end wall 13*a*.

Thus, locally, at the back draft, the pattern has a gradually increasing section toward the end wall 13*a*.

When the paraison of a molten glass item overmolds the punch 10, the paraison has, at the pattern 15, a back-draft shape complementary to that of the pattern 15. Despite the complementary back-draft shape of the paraison, the stripping of such a paraison remains possible, since the paraison has a certain degree of elasticity, due to the malleability of the molten glass.

The raised and/or hollow pattern 15 is superimposed on the general tapered shape of the end portion 13.

The body 11 of the punch 10 includes a guide ring 14.

The device for manufacturing the glass item 1 includes, as shown in FIGS. 3 and 4, a mold 20 comprising a cavity 21 with a shape substantially corresponding to the outer shape of the glass item 1.

Typically, the mold 20 includes, at the upper portion thereof, an opening 22 for inserting at least one drop of glass. This opening 22 is closed off by a bottom 23 against which the bottom 4 of the item 1 is formed. The mold 20 includes, at the lower portion thereof, an opening 24 for passage of the punch 10, as will be seen later.

Below the opening 24, the mold 20 also includes a ring mold 25 designed to form the ring 5 of the item 1. This ring mold 25 is provided with a central opening 26 for the passage of the punch 10. The ring mold 25 inwardly bears a guide sleeve 27 for guiding the movable punch 10 between a passive position, shown in FIG. 3 and in which the end wall 13*a* of the punch 10 closes off the central opening 26, and an active position, shown in FIG. 4 and in which the punch 10 protrudes in the cavity 21 of the mold 20 so as to form the item 1.

The guide sleeve 27 inwardly includes a vertical slot 28 cooperating with a lug 16 formed at the periphery of the ring 14 of the punch 10 and designed to position the punch 10 to imprint the at least one raised and/or hollow pattern 15 at the chosen location on the inner surface 6 of the wall 3 of the item 1.

The punch 10 may inwardly include a cooling element, for example such as a nozzle, not shown.

The following method is used to produce the glass item 1.

First and after having removed the bottom 23 of the mold 20, at least one drop of molten glass is placed in the cavity 21, the cavity 21 being closed off at the lower portion thereof by the end wall 13*a* of the punch 10, as shown in FIG. 3.

Then, the bottom 23 is replaced on the mold 20 and suitable means of a known type are used to actuate the punch 10, which moves between the passive position, shown in FIG. 3, and the active position, shown in FIG. 4, and in which the punch 10 protrudes inside the cavity 21 of the mold 20.

In this way, the punch 10, by penetrating the cavity 21, forms the glass item 1 by giving it its outer shape and its inner shape. At the same time, the punch 10 imprints, on an inner surface 6 of the wall 3 of the bottle 1, at least one raised and/or hollow pattern 8 by means of at least one raised and/or hollow pattern 15 formed on the body 11 of the punch 10.

In the example embodiment of FIGS. 1 and 2, the punch 10 imprints, on an inner side surface of the wall 3 of the bottle 1, at least one raised and/or hollow pattern 8 by means of at least one raised and/or hollow pattern 15 formed in the outer side surface of the end portion 13 of the body 11 of the punch 10.

During imprinting on an inner side surface of the wall 3 of the bottle 1 of at least one raised and/or hollow pattern 8, the pattern 15 imparts a back-draft shape to the molten glass intended to form the glass item 1. This back-draft shape makes up the paraison of the raised and/or hollow pattern 8 of the glass item 1.

Of course, the outer and inner shapes of the body 2 of the glass item 1 may be different from those shown in FIG. 1.

Next, the punch 10 is removed by returning it to its passive position through an axial movement, and the glass item 1 is stripped. One will see that, during removal of the punch 10, the glass item deforms elastically to allow the passage of the pattern 15, then the glass item regains its shape, allowing the pattern 8 to appear.

The device according to the present invention makes it possible to form the hollow glass item and imprint at least one raised and/or hollow pattern on an inner surface of at least one wall of said item in a single operation.

What is claimed is:

1. A method for manufacturing a hollow glass item comprising the steps of:
    placing at least one drop of glass in a cavity of a mold;
    inserting a punch into the cavity of the mold, the punch having a body with an end portion, the end portion having an outer side surface, the body including a raised or hollow pattern on the outer side surface of the end portion;
    forming the hollow glass item by using the punch and simultaneously imprinting at least one raised or hollow pattern at a chosen location on an inner surface of at least one wall of the hollow glass item, thereby superimposing the at least one raised or hollow pattern on the shape of the hollow glass item, the raised or hollow pattern being independent of the shape of the hollow glass item;
    removing the punch from the cavity of the mold; and
    stripping the hollow glass item, which includes the at least one inner raised and/or hollow pattern,
    wherein the punch has a ring with a lug formed at a periphery of the ring, the lug projecting radially outwards, wherein there is provided a vertical slot at a guide sleeve, the lug cooperating with the vertical slot to angularly position the punch to imprint the at least one raised and/or hollow pattern at the chosen location.

2. The method according to claim 1 wherein the end portion has a gradually decreasing section toward an end wall.

3. The method according to claim 1 wherein the end portion has a generally tapered shape ending with an end wall.

4. The method according to claim 1 wherein the punch has an end wall with a raised or hollow pattern for forming a further raised or hollow pattern on the inner surface of the at least one wall of the hollow glass item during shaping of the hollow glass item.

5. The method according to claim 1, wherein the raised or hollow pattern of the body has a shape that is locally back-draft and has at least one surface in which a normal is oriented in a direction away from an end wall.

6. The method according to claim 5 wherein, locally, at the back draft, the raised or hollow pattern has a gradually increasing section toward the end wall.

7. The method according to claim 1 wherein the end portion ends with an end wall.

8. The method as recited in claim 1 wherein the hollow glass item is a bottle or ajar.

9. The method according to claim 1, wherein the hollow glass item comprises a hollow body defining a container delimited by a cylindrical wall and a bottom, the hollow body including an upper portion opposite the bottom, the upper portion being provided with a ring, and wherein the mold includes an opening for passage of the punch, and below the opening, the mold further includes a ring mold, the ring mold forming the ring.

10. The method according to claim 9, further comprising a step of passing the punch through a central opening of the ring mold.

11. The method according to claim 10, wherein the ring mold inwardly bears the guide sleeve for guiding the movable punch, and wherein the movable punch is moved between a passive position, in which an end wall of the punch closes off the central opening, and an active position, in which the punch protrudes in the cavity of the mold so as to form the hollow glass item.

12. The method according to claim 1, wherein the punch includes an outer shape which is rectangular, square or ovoid.

13. The method according to claim 1, wherein the punch inwardly includes a cooling element.

14. The method according to claim 1, wherein the pattern is raised.

15. The method according to claim 1, wherein the pattern is hollow.

16. The method according to claim 1, wherein the body comprises a first portion and the end portion extending the first portion.

17. The method according to claim 16, wherein the first portion is cylindrical.

18. The method according to claim 1, wherein the end portion includes a draft angle from 2° to 15° relative to an axis of the end portion.

19. The method according to claim 18, wherein the draft angle is from 2° to 10°.

* * * * *